US009605543B2

(12) United States Patent
Nunez et al.

(10) Patent No.: US 9,605,543 B2
(45) Date of Patent: *Mar. 28, 2017

(54) TURBINE ENGINE BLADE MADE OF COMPOSITE MATERIAL, AND A METHOD OF FABRICATING IT

(75) Inventors: Romain Nunez, Martignas sur Jalle (FR); Stephane Blanchard, Chartrettes (FR); Guillaume Renon, Vaux le Penil (FR); Dominique Coupe, Le Haillan (FR); Clement Roussille, Bordeaux (FR)

(73) Assignees: SNECMA, Paris (FR); HERAKLES, Le Haillan (FR)

( * ) Notice: Subject to any disclaimer, the term of this patent is extended or adjusted under 35 U.S.C. 154(b) by 1253 days.

This patent is subject to a terminal disclaimer.

(21) Appl. No.: 13/515,879

(22) PCT Filed: Dec. 10, 2010

(86) PCT No.: PCT/FR2010/052666
§ 371 (c)(1),
(2), (4) Date: Nov. 1, 2012

(87) PCT Pub. No.: WO2011/080443
PCT Pub. Date: Jul. 7, 2011

(65) Prior Publication Data
US 2013/0089429 A1    Apr. 11, 2013

(30) Foreign Application Priority Data

Dec. 14, 2009 (FR) ..................... 09 58931

(51) Int. Cl.
*F01D 5/14* (2006.01)
*C04B 35/571* (2006.01)
(Continued)

(52) U.S. Cl.
CPC .............. *F01D 5/147* (2013.01); *B23P 15/04* (2013.01); *B29B 11/16* (2013.01); *C04B 35/571* (2013.01);
(Continued)

(58) Field of Classification Search
CPC ......... F01D 5/282; F01D 9/02; B29C 70/222; C04B 2235/5256
(Continued)

(56) References Cited

U.S. PATENT DOCUMENTS 3,632,460 A    1/1972  Palfreyman et al.
5,854,154 A   12/1998  Radford et al.
(Continued)

FOREIGN PATENT DOCUMENTS

EP    1 526 285      4/2005
JP    2003 148105    5/2003
WO    2005 011962    2/2005

OTHER PUBLICATIONS

Mouritz, A.P., et al., "Review of applications for advanced three-dimensional fibre textile composites," Composites: Part A, Applied Science and Manufacturing, vol. 30, No. 12, pp. 1445-1461, (Dec. 1, 1999).

(Continued)

*Primary Examiner* — John K Fristoe, Jr.
*Assistant Examiner* — Michael Sehn
(74) *Attorney, Agent, or Firm* — Oblon, McClelland, Maier & Neustadt, L.L.P.

(57) ABSTRACT

A turbine engine blade made of composite material including fiber reinforcement densified by a matrix is fabricated by a method including: performing three-dimensional weaving to make a single-piece fiber blank; shaping the fiber blank to obtain a single-piece fiber preform having a first portion forming a preform for a blade root and an airfoil, at least one (Continued)

second portion forming a preform for a blade inner platform or for wipers of a blade outer platform, and at least one third portion forming a preform for reinforcing a blade inner platform or for overhangs of a blade outer platform; and densifying the fiber preform with a matrix to obtain a composite material blade having fiber reinforcement constituted by the preform and densified by the matrix, and forming a single piece with an inner and/or outer platform incorporated therein.

16 Claims, 9 Drawing Sheets

(51) Int. Cl.
    *C04B 35/628*     (2006.01)
    *C04B 35/80*     (2006.01)
    *D03D 11/02*     (2006.01)
    *D03D 25/00*     (2006.01)
    *F01D 5/28*     (2006.01)
    *B23P 15/04*     (2006.01)
    *B29B 11/16*     (2006.01)

(52) U.S. Cl.
CPC .. *C04B 35/62868* (2013.01); *C04B 35/62873* (2013.01); *C04B 35/62884* (2013.01); *C04B 35/62897* (2013.01); *C04B 35/806* (2013.01); *D03D 11/02* (2013.01); *D03D 25/005* (2013.01); *F01D 5/282* (2013.01); *C04B 2235/5244* (2013.01); *C04B 2235/5252* (2013.01); *C04B 2235/614* (2013.01); *C04B 2235/616* (2013.01); *F05D 2300/603* (2013.01); *F05D 2300/6012* (2013.01); *F05D 2300/614* (2013.01); *Y02T 50/67* (2013.01); *Y02T 50/672* (2013.01); *Y02T 50/673* (2013.01); *Y10T 29/49337* (2015.01)

(58) Field of Classification Search
USPC ........................................................ 29/889.71
See application file for complete search history.

(56) References Cited

U.S. PATENT DOCUMENTS

| | | | | |
|---|---|---|---|---|
| 5,990,025 | A * | 11/1999 | Suyama | ................ C04B 35/573 428/570 |
| 6,676,373 | B2 * | 1/2004 | Marlin | .................... B29C 70/34 29/889.71 |
| 6,821,087 | B2 * | 11/2004 | Matsumoto | ............. F01D 5/282 415/191 |
| 7,241,112 | B2 * | 7/2007 | Dambrine | ............... B29C 70/48 29/889.7 |
| 9,045,992 | B2 * | 6/2015 | Roussille | ................ B29C 70/24 |
| 2005/0084377 | A1 | 4/2005 | Dambrine et al. | |
| 2006/0257260 | A1 | 11/2006 | Dambrine et al. | |
| 2007/0248780 | A1 | 10/2007 | Schober et al. | |
| 2014/0030076 | A1 * | 1/2014 | Nunez | .................... F01D 5/282 415/183 |

OTHER PUBLICATIONS

International Search Report Issued Apr. 13, 2011 in PCT/FR10/52666 filed Dec. 10, 2010.
U.S. Appl. No. 13/515,879, filed Jun. 14, 2012, Nunez, et al.
U.S. Appl. No. 13/607,131, filed Sep. 7, 2012, Roussille, et al.
U.S. Appl. No. 13/606,935, filed Sep. 7, 2012, Roussille, et al.

* cited by examiner

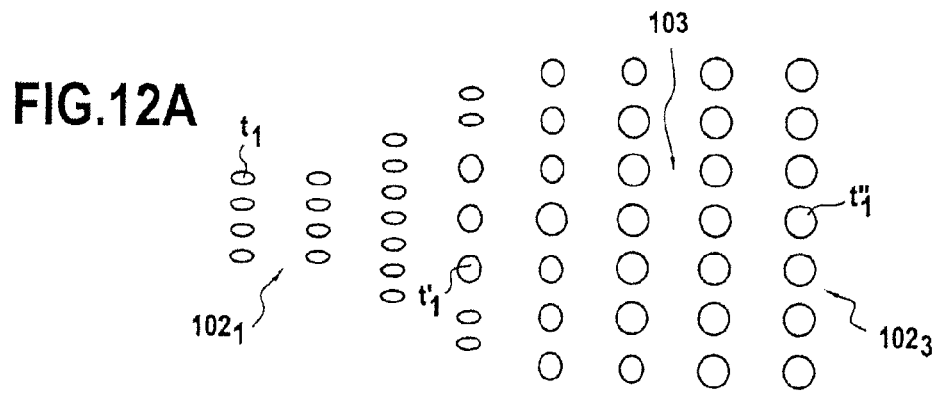
FIG.12A
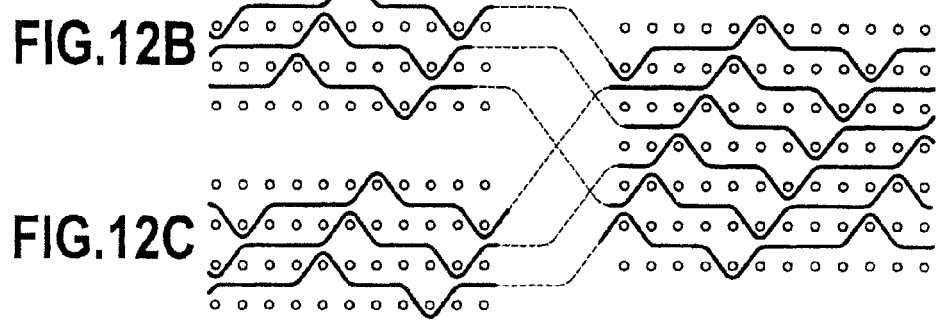
FIG.12B
FIG.12C
FIG.12D
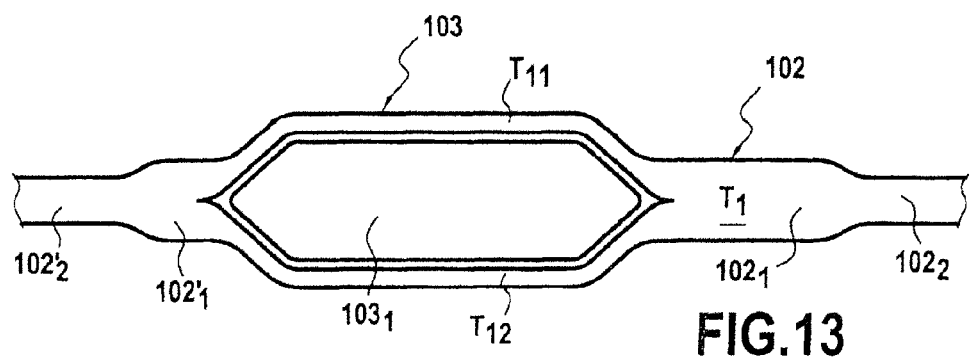
FIG.13

TURBINE ENGINE BLADE MADE OF COMPOSITE MATERIAL, AND A METHOD OF FABRICATING IT

BACKGROUND OF THE INVENTION

The invention relates to turbine engine blades made of composite material comprising fiber reinforcement densified by a matrix.

The intended field is that of gas turbine blades for aeroengines or industrial turbines.

Proposals have already been made to fabricate composite material blades for turbine engines. Reference may be made in particular to patent applications FR 2 939 129 and FR 2 939 130 filed jointly by Snecma and Snecma Propulsion Solide. Those applications describe in particular fabricating a turbine engine blade out of composite material comprising fiber reinforcement densified by a matrix. More precisely, the method described in those two documents and applied to fabricating a blade presents the special feature of a fiber blank that is made by three-dimensional weaving and that is shaped in order to obtain a single-piece fiber preform with a first portion forming a preform for a blade root and an airfoil, and at least one second portion forming a preform for an inner or an outer platform of the blade. Thus, once the preform has been densified, it is possible to obtain a composite material blade having fiber reinforcement constituted by the preform and densified by the matrix, and forming a single piece that has an inner or an outer platform incorporated therein.

The blade obtained by such a method presents the drawback that its outer platform cannot incorporate both a function of providing sealing with the casing that surrounds the blades (by having wipers present) and an aerodynamic function (by having overhangs present that define the outside of the flow passage for the gas stream through the turbine). Furthermore, at its root, the overhangs of the inner blade platform that is obtained by that method can break under the effect of the high levels of force to which they are subjected in operation (this force being due to the centrifugal force of rotation).

OBJECT AND SUMMARY OF THE INVENTION

A main object of the present invention is thus to mitigate such drawbacks by proposing a blade of composite material that forms a single piece having an inner and/or an outer platform incorporated therein, and in which the outer and inner platforms present the required properties.

This object is achieved by a method of fabricating a turbine engine blade out of composite material comprising fiber reinforcement densified by a matrix, the method comprising:

performing three-dimensional weaving to make a single-piece fiber blank;

shaping the fiber blank to obtain a single-piece fiber preform having a first portion forming a preform for a blade root and an airfoil, at least one second portion forming a preform for a blade inner platform or for wipers of a blade outer platform, and at least one third portion forming a preform for reinforcement of a blade inner platform or for overhangs of a blade outer platform; and densifying the fiber preform with a matrix in order to obtain a composite material blade having fiber reinforcement constituted by the preform and densified by the matrix, and forming a single piece with an inner and/or outer platform(s) incorporated therein.

Compared with the method described in patent application FR 2 939 129 and in patent application FR 2 939 130 in its application to fabricating a blade, the invention applies in particular to making use of a third portion while shaping the fiber blank, which third portion forms a preform for reinforcement of a blade inner platform or for overhangs of a blade outer platform. As a result, the blade obtained by the method of the invention may present the required properties, i.e. a sealing function and an aerodynamic function at its outer platform and an inner platform having twice the thickness, thereby reinforcing its mechanical strength.

Furthermore, when the third portion of the fiber preform is used to form a preform for an overhang of a blade outer platform, the blade obtained by the method of the invention enables the flow passage for the gas stream passing through the turbine in which the blade is installed to be reconstituted in part both on the inside (by the blade inner platform) and on the outside (by the overhangs of the blade outer platform).

According to an advantageous feature of the method, in the longitudinal direction corresponding to the longitudinal direction of the fiber blank that is to be fabricated, the fiber blank comprises: a first set of a plurality of yarn layers that are linked together to form a first portion of the blank corresponding to the preform for the blade root and airfoil; a second set of a plurality of yarn layers that are linked together at least locally to form at least a second portion of the blank corresponding to the preform for the blade inner platform or for the wipers of the blade outer platform; and a third set of a plurality of yarn layers that are linked together at least locally to form at least a third portion of the blank corresponding to the preform for reinforcement of the blade inner platform or for the overhangs of the blade outer platform; in that the yarns of the first set of yarn layers are not linked with the yarns of the second and third sets of yarn layers; and in that the first set of yarn layers has yarns of the second and third sets of yarn layers crossing through the or each second portion of the fiber blank and through the or each third portion of the fiber blank.

Providing non-linked zones enables the fiber preform to be shaped without cutting linking yarns, where such cutting can reduce the mechanical strength of the fiber reinforcement and thus of the blade that is fabricated therefrom.

According to another feature of the method, the fiber blank is woven with second and third continuous sets of yarn layers and the shaping of the fiber blank includes eliminating portions of the second and third sets of yarn layers that lie outside the or each second fiber blank portion and the or each third fiber blank portion by cutting them off.

The second and third sets of yarn layers may cross through the first set of yarn layers in the same direction. Alternatively, the second and third sets of yarn layers cross through the first set of yarn layers in opposite directions.

According to yet another feature of the method, in the first portion of the fiber blank and in the direction that corresponds to the direction along which the profile of a varying-thickness airfoil extends in the blade that is to be fabricated, the number of yarn layers in the first set of yarn layers is constant. The yarns of the first set of yarns may then be of varying weight and/or thread count.

Advantageously, three-dimensional weaving is used to make a strip comprising a succession of fiber blanks. They may then be cut out from the strip. The blanks may be woven with their longitudinal direction that corresponds to the direction of the blades that are to be fabricated extending either in the weft direction or in the warp direction.

The invention also provides a turbine engine blade made of composite material comprising fiber reinforcement obtained by three-dimensional weaving of yarns and densified by means of a matrix, the blade comprising a first portion constituting a root and airfoil of the blade and that is formed integrally with: at least one second portion constituting a blade inner platform or wipers of a blade outer platform; and at least one third portion constituting inner platform reinforcement or a preform for overhangs of a blade outer platform; the fiber reinforcement portions corresponding to the first, second, and third blade portions being mutually interleaved at least in part with the yarns of the first portion of fiber reinforcement penetrating into the second portion of fiber reinforcement.

The blade may be made of ceramic matrix composite material.

According to a feature of the blade, the yarns constituting the portion of the fiber reinforcement that corresponds to the second and third portions of the blade cross through the portion of the fiber reinforcement that corresponds to the first portion of the blade.

The airfoil of the blade may have a profile of varying thickness along which the fiber reinforcement portion corresponding to the first blade portion has, in the longitudinal direction of the blade, a constant number of layers of yarns that are of varying weight and/or thread count, or a varying number of yarn layers.

The invention also provides a turbine engine fitted with at least one blade as defined above.

BRIEF DESCRIPTION OF THE DRAWINGS

Other characteristics and advantages of the present invention appear from the following description made with reference to the accompanying drawings, which show implementations having no limiting character. In the figures:

FIG. 12A is a weft section view showing an example of the arrangement of weft yarns in a fiber blank portion corresponding to a portion of the blade root;

FIGS. 12B to 12D are weft section views showing warp planes for an example of (multilayer) three-dimensional weaving in the fiber blank portion of FIG. 12A;

FIG. 13 is a fragmentary diagrammatic section view showing another way of making a blank portion corresponding to a blade root;

DETAILED DESCRIPTION OF IMPLEMENTATIONS

Figure 1:
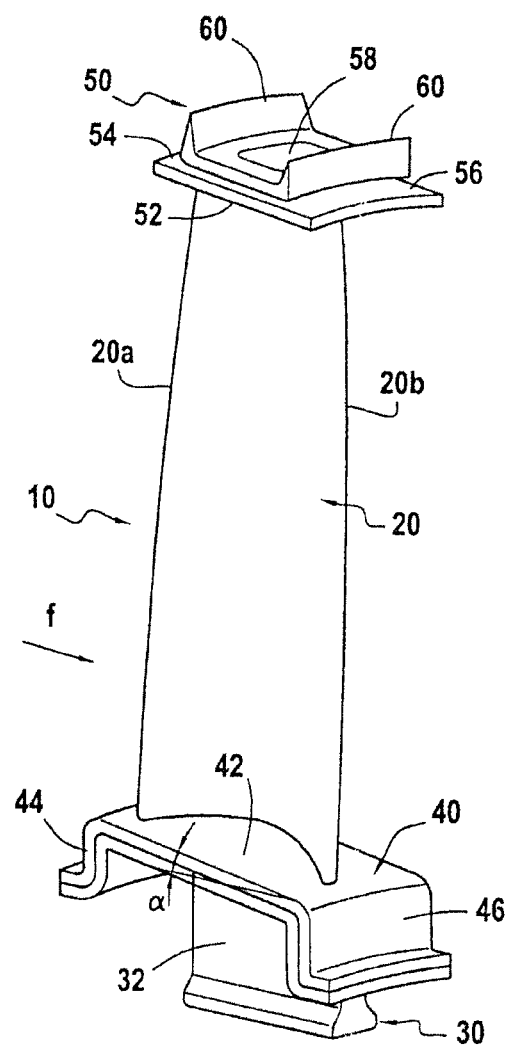
FIG. 1 is a perspective view of a turbine engine blade having inner and outer platforms incorporated therein.

The invention is applicable to various types of turbine engine blade having inner and/or outer platforms incorporated therein, in particular compressor and turbine blades of various gas turbine spools, e.g. a low pressure (LP) turbine rotor blade such as that shown in FIG. 1.

The blade 10 of FIG. 1 comprises in well-known manner an airfoil 20, a root 30 constituted by a portion of greater thickness, e.g. having a bulb-shaped section and extended by a tang 32, an inner platform 40 situated between the tang 32 and the airfoil 20, and an outer platform 50 in the vicinity of the free end of the blade.

The airfoil 20 extends in a longitudinal direction between the inner platform 40 and the outer platform 50 and in cross-section it presents a curved profile of varying thickness between its leading edge 20a and its trailing edge 20b.

The blade 10 is mounted on a turbine rotor (not shown) by engaging the root 30 in a housing of complementary shape formed at the periphery of the rotor. The root 30 is extended by the tang 32 so as to connect with the inner (or bottom) face of the inner platform 40;

At its radially inner end, the airfoil 20 is connected to an outer (or top) face 42 of the inner platform 40, which face defines the inside of the gas stream flow passage through the turbine. In its upstream and downstream end portions (in the flow direction f of the gas stream), the platform is terminated by overhangs 44 and 46. In the example shown, the face 42 of the inner platform slopes so that overall it forms a non-zero angle α relative to the normal to the longitudinal direction of the blade. Depending on the profile desired for the inside surface of the gas stream flow passage, the angle α may be zero, or the face 42 may have a profile that is generally not rectilinear, e.g. a curved profile.

At its radially outer end, the airfoil is connected to the outer platform 50 via an inner (bottom) face 52 of the platform that defines the outside of the gas stream flow passage. In its upstream and downstream portions, the outer platform is terminated by overhangs 54 and 56. On the outside (on top), the outer platform defines a depression or bathtub 58. Along the upstream and downstream edges of the bathtub 58, the platform carries wipers 60 presenting a tooth-shaped profile with tips suitable for penetrating into a layer of abradable material of a turbine ring (not shown) so as to reduce the clearance between the tip of the blade and the turbine ring. In the example shown, the face 52 of the outer platform extends substantially perpendicularly to the longitudinal direction of the blade. In a variant, and depending on the profile desired for the outside surface of the gas stream flow passage, the face 52 could be inclined so as to form overall a non-zero angle relative to the normal to the longitudinal direction of the blade, or else the face 52 could have a profile that is generally not rectilinear, e.g. a curved profile.

Figure 2:
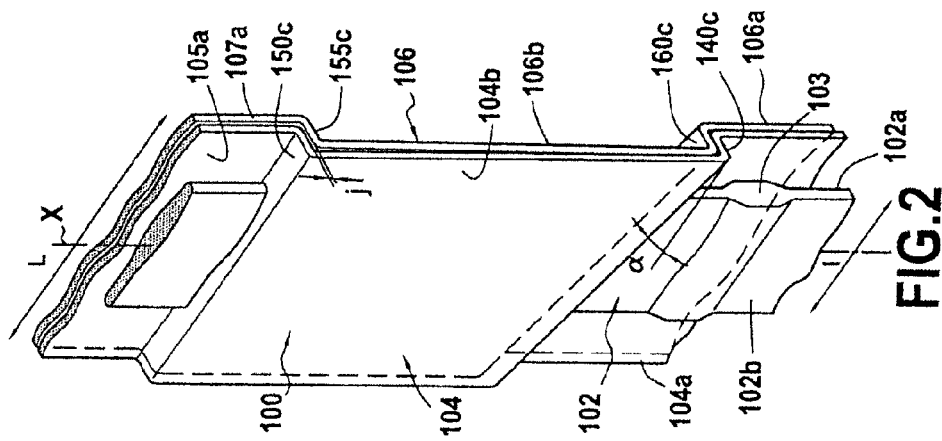
FIG. 2 is a highly diagrammatic view of an example arrangement of three sets of layers of yarns in a three-dimensional woven fiber blank for use in making a fiber preform for a blade of the kind shown in FIG. 1.

FIG. 2 is a highly diagrammatic view of a fiber blank 100 from which a blade fiber preform can be shaped so that once it has been densified with a matrix and possibly also machined, a composite material blade is obtained having platforms incorporated therein, like the blade shown in FIG. 1.

The blank 100 comprises three portions 102, 104, and 106 that are obtained by three-dimensional weaving or multi-layer weaving, and only the envelopes of these three portions are shown in FIG. 2. After shaping, the portion 102 is to constitute a blade fiber preform portion that corresponds to a preform for the airfoil and the root of the blade. After shaping, the portion 104 is designed to constitute the portions of the blade fiber preform that correspond to preforms for the inner platform of the blade and for the wipers of the outer platform of the blade. After shaping, the portion 106 is to constitute portions of the blade fiber preform that correspond to preforms for reinforcement of the blade inner platform and for the overhangs of the blade outer platform.

The three portions 102, 104, and 106 are in the form of strips that extend generally in a direction X that corresponds to the longitudinal direction of the blade that is to be made. In its portion that is to form an airfoil preform, the fiber strip 102 presents varying thickness that is determined as a function of the thickness of the profile of the airfoil of the blade that is to be made. In its portion that is to form a root preform, the fiber strip 102 presents extra thickness 103 that is determined as a function of the thickness of the root of the blade that is to be made.

The fiber strip 102 has a width l that is selected as a function of the length of the developed (i.e. flat) profile of the airfoil and of the root of the blade that is to be made, whereas each of the fiber strips 104 and 106 has a width L greater than l that is selected as a function of the developed lengths of the inner and outer platforms of the blade that is to be made.

The fiber strips 104 and 106 are of substantially the same width, and each of them is of substantially constant thickness that is determined as a function of the thicknesses of the inner and outer platforms of the blade that is to be made. Each of the strips 104 and 106 has a first portion 104a, 106a that extends along and in the vicinity of a first face 102a of the strip 102, a second portion 104b, 106b that extends along and in the vicinity of the second face 102b of the strip 102, and a third portion 105a, 107a that extends along and in the vicinity of the first face 102a of the strip 102.

The portions 104a and 104b of the strip 104 are connected together by a connection portion 140c that extends transversely relative to the strip 102 at a location corresponding to the location of the inner platform of the blade that is to be made. The connection portion 140c crosses through the strip, forming an angle α relative to the normal to the longitudinal direction of the fiber blank. Similarly, the portions 106a and 106b of the strip 106 are connected together by a connection portion 160c that extends transversely relative to the strip 102 and that is substantially parallel to the connection strip 140c (possibly being spaced apart therefrom).

The portions 104b and 105a of the strip 104 are connected together by a connection portion 150c that extends transversely relative to the strip 102 at a location corresponding to the location of the outer platform of the blade to be made. In the example shown, the connection portion 150c crosses through the strip 102 substantially perpendicularly to the longitudinal direction X of the fiber blank. Similarly, the portions 106b and 107a of the strip 106 are connected together by a connection portion 155c that extends transversely relative to the strip 102 and that is substantially parallel to and spaced apart from the connection strip 150c by clearance j.

Depending on the shape desired for the outer platform of the blade, the connection portions 150c, 155c may cross through the strip 102 so as to form a non-zero angle relative to the normal to the longitudinal direction X of the blank, as with the inner platform. In addition, the profiles of the connection portions 140c, 160c and/or the profiles of the connection portions 150c, 155c may be curvilinear instead of being rectilinear as in the examples shown.

The clearance j provided between the connection portions 150c and 155c could also be zero. Similarly, it is possible to provide non-zero clearance between the connection portions 140c and 160c.

As described in greater detail below, the strips 102, 104, and 106 are woven simultaneously by three-dimensional weaving, without interlinking, firstly between the strip 102 and the portions 104a, 104b, and 105a of the strip 104, and secondly between the strip 102 and the portions 106a, 106b, and 107a of the strip 106, and while weaving a plurality of successive blanks 100 continuously in the direction X. Likewise, no interlinking is provided between the various portions of the strips 104 and 106.

Figure 5:
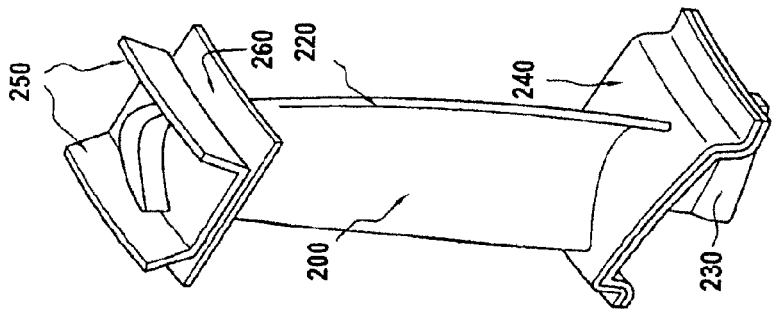
FIGS. 3, 4, and 5 show successive steps in the making of a fiber preform for a blade as shown in FIG. 1, starting from the fiber blank of FIG. 2.
Figure 4:
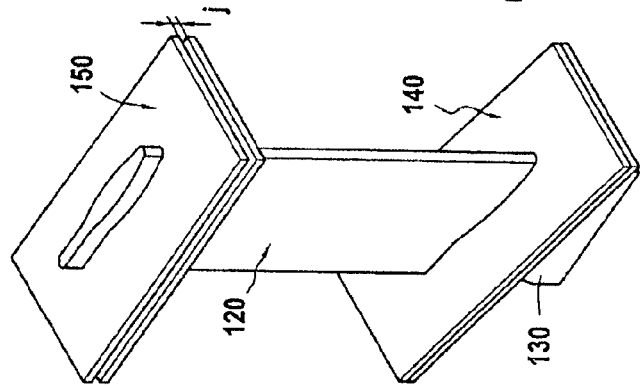
Figure 3:
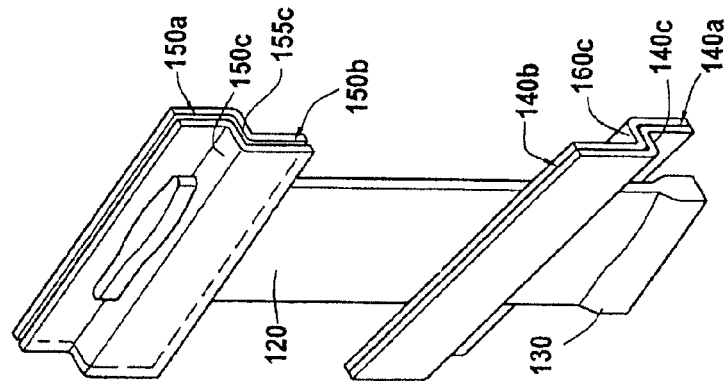

FIGS. 3 to 5 show very diagrammatically how a fiber preform having a shape close to the shape of the blade that is to be fabricated can be obtained starting from the fiber blank 100.

The fiber strip 102 is cut at one end through the extra thickness 103 and at another end a little beyond the connection portions 150c, 155c so as to obtain a strip 120 of length corresponding to the longitudinal dimension of the blade that is to be fabricated, with an enlarged portion 130 formed by a portion of the extra thickness 103 and situated at a location corresponding to the position of the root of the blade that is to be fabricated.

In addition, cuts are formed at the ends of the portions 104a, 105a of the strip 104, at the ends 106a, 107a of the strip 106, and in the portions 104b, 106b thereof so that segments 140a and 140b remain on either side of the connection portions 140c, 160c, and also segments 150a, 150b remain on either side of the connection portions 150c, 155c, as shown in FIG. 3. The lengths of the segments 140a, 140b and 150a, 150b are determined as a function of the lengths of the inner and outer platforms of the blade that is to be fabricated.

Because of the non-interlinking firstly between the strip 102 and the portions 104a, 104b, and 105a of the strip 104 and also between the strip 102 and the portions 106a, 106b, and 107a of the strip 106, the segments 140a, 140b, 150a, and 150b can be folded out perpendicularly to the strip 102 without cutting yarns in order to form plates 140, 150, as shown in FIG. 4.

A fiber preform 200 of the blade that is to be fabricated is subsequently obtained by molding with the strip 102 being deformed to reproduce the curved profile of the airfoil of the blade. The two layers making up the bottom plate 140 are also deformed so as to reproduce a shape similar to the shape of the blade platform (in particular including its overhangs). Similarly, the top layer of the plate 150 is deformed to reproduce a shape similar to that of the wipers of the outer platform of the blade, and the bottom layer of the plate 150 is deformed to reproduce a shape similar to the shape of the overhangs of the outer platform of the blade (see FIG. 5). A preform 200 is thus obtained with an airfoil preform portion 220, a root preform portion 230 (including a tang preform), an inner platform preform portion 240 (of double thickness), an outer platform wiper preform portion 250, and a portion 260 constituting a preform for the overhangs of the blade outer platform.

Figure 6B:
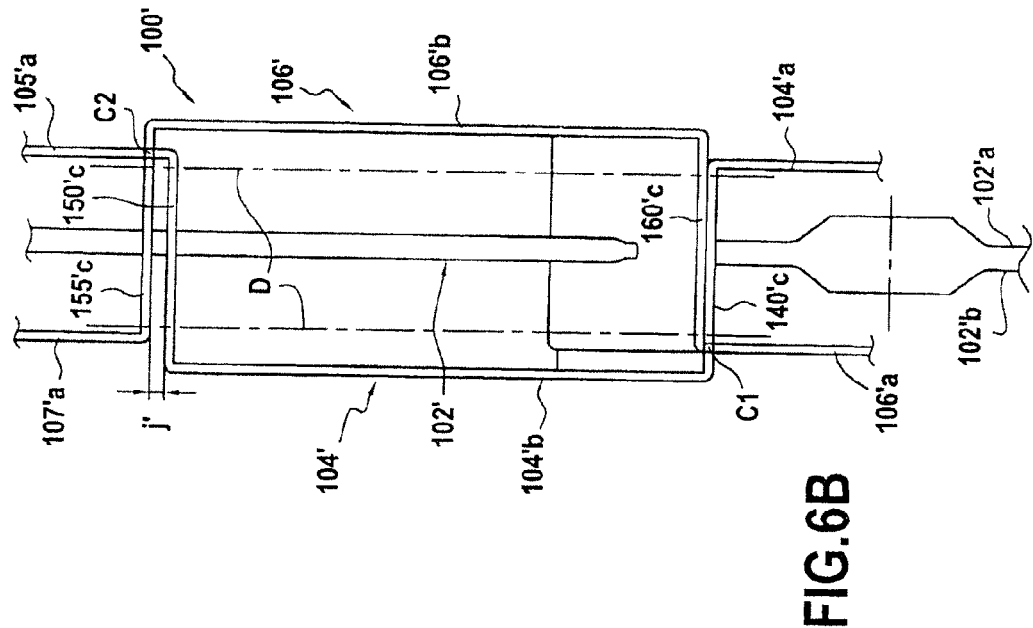
FIGS. 6A and 6B are highly diagrammatic views of another example of an arrangement of three sets of layers of yarns in a three-dimensional woven fiber blank for making a fiber preform for a blade of the kind shown in FIG. 1.
Figure 6A:
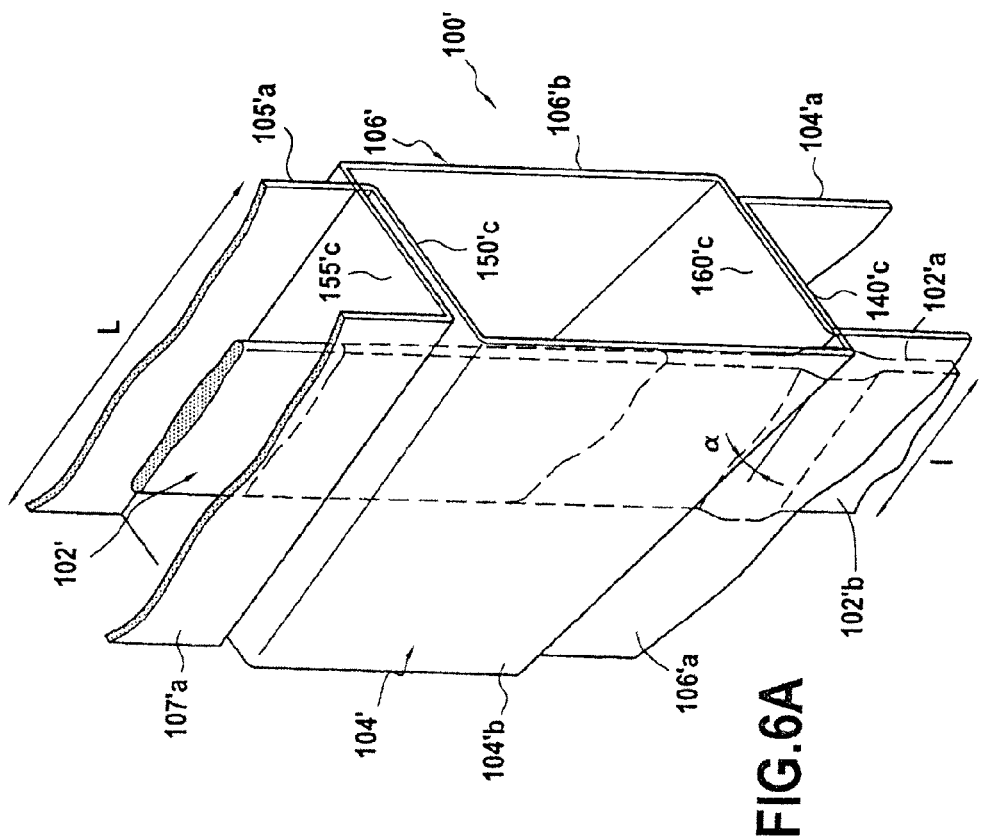

FIGS. 6A and 6B show another example of a fiber blank 100' from which a blade fiber preform can also be shaped.

Like the fiber blank described with reference to FIG. 2, this blank 100 comprises three portions 102', 104', and 106' that are obtained by three-dimensional weaving or multilayer weaving, with only the envelopes of these three portions being shown in FIGS. 6A and 6B.

Compared with the blank of FIG. 2, the first portion 104'a of the strip 104' extends along and in the vicinity of the first face 102'a of the strip 102', while the first portion 106'a of the strip 106' extends along and in the vicinity of the second face 102'b of the strip 102' that is opposite from the first face. The second portion 104'b of the strip 104' extends along and in the vicinity of the second face 102'b of the strip 102', and the second portion 106'b of the strip 106' extends along and in the vicinity of the first face 102'a of the strip 102'. Finally, the third portion 105'a of the strip 104' extends along and in the vicinity of the first face 102'a of the strip 102', and the third portion 107'a of the strip 106' extends along and in the vicinity of the second face 102'b of the strip 102'.

The portions 104'a and 104'b of the strip 104' are connected together by a connection portion 140'c that crosses through the strip 102 in one direction, while the portions 106'a and 106'b of the strip 106 are connected together by a connection portion 160'c that crosses through the strip 102 in the opposite direction. Similarly, the portions 104'b and 105'a of the strip 104' are connected together by a connection portion 150'c that crosses through the strip 102 in one direction, while the portions 106'b and 107'a of the strip 106' are connected together by a connection portion 155'c that crosses through the strip 102 in the opposite direction and that is spaced apart from the connection strip 150'c by non-zero clearance j' (no clearance is provided in this example between the connection portions 140'c and 160'c).

The manner in which a fiber preform having a shape close to that of the blade that is to be fabricated can be obtained from this fiber blank 100' is identical to that described with reference to FIGS. 3 to 5, and is therefore not described again in detail.

In particular, cuts are formed at the ends of the connection portions 140'c, 160'c so as to avoid keeping the first portions 104'a and 106'a of the strips 104' and 106'. Similarly, at the outer platform of the blade to be fabricated, cuts are made at the ends of the connection portions 150'c, 155'c so as to eliminate the third portions 105'a and 107'a of the strips 104' and 106' (the lines of cut are shown diagrammatically in FIG. 6B by chain-dotted lines D). In other words, the plates that are subsequently deformed so as to reproduce shapes similar to those of the inner and outer platforms of the blade are constituted solely by the connection portions 140'c, 160'c and 105'a and 107'a. Thus, the crossing C1 between the layers of yarns of the first portion 106'a of the strip 106' and of the connection portion 140'c is eliminated, and similarly the crossing C2 between the layers of yarns of the third portion 105'a of the strip 104' and of the connection portion 155'c are also eliminated.

Only the differences relative to the FIG. 2 fiber blank are described in detail below. Naturally, the other characteristics of the blank described with reference to FIG. 2 are applicable to this embodiment.

Furthermore, from the two fiber blank examples 100 and 100', it is possible to imagine variant embodiments in which only the preform of the inner platform or only the preform of the outer platform of the blade that is to be fabricated is formed from a single fiber strip.

As described below, the steps of making a blade preform from a fiber blank are advantageously performed after the fibers of the blank have been treated and impregnated with a consolidation composition.

A method of three-dimensionally weaving the fiber blank 100 is described below in detail.

It is assumed that the weaving is performed with warp yarns extending in the longitudinal direction X of the blank, it being specified that it is also possible to perform weaving with the weft yarns extending in this direction.

Variation in the thickness of the strip 102 along its length is obtained by using weft yarns of varying weight. In a variant, or in addition, it is possible to vary the thread count of the warp yarns (number of yarns per unit length in the weft direction), a smaller thread count making greater thinning possible when shaping the preform by molding.

Figure 7:
FIG. 7 is a section view showing the profile laid out flat of an airfoil of a blade such as that shown in FIG. 1.
Figure 8:
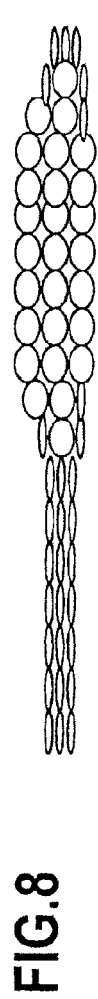
FIG. 8 is a section view of a set of warp yarn layers suitable for obtaining a profile of the kind shown in FIG. 7.

Thus, to obtain a blade airfoil profile as shown in flat projection in FIG. 7, it is possible to use three layers of warp yarns of varying weights and counts as shown in FIG. 8.

In an embodiment, the yarns used may be silicon carbide (SiC) yarns supplied under the name "Nicalon" by the Japanese supplier Nippon Carbon having a weight (expressed as a number of filaments) of 0.5 K (i.e. 500 filaments).

The warp is made up using 0.5 K SiC yarns and 1 K SiC yarns obtained by uniting two 0.5 K yarns, the two yarns being united by wrapping. The wrapping is advantageously implemented using a yarn of temporary nature suitable for being eliminated after weaving, e.g. a yarn of polyvinyl alcohol (PVA) that can be eliminated by being dissolved in water.

Table I below specifies for each column of warp yarns the thread count (number of yarns per centimeter in the length of the profile), the number of 0.5 K yarns, the number of 1 K yarns, and the thickness of the profile in millimeters (mm), where said thickness varies over the range about 1 mm to 2.5 mm:

TABLE I

| Column | 1 | 2 | 3 | 4 | 5 | 6 | 7 | 8 | 9 | 10 | 11 | 12 | 13 | 14 | 15 | 16 | 17 | 18 | 19 |
| --- | --- | --- | --- | --- | --- | --- | --- | --- | --- | --- | --- | --- | --- | --- | --- | --- | --- | --- | --- |
| Count | 6 | 6 | 6 | 6 | 6 | 6 | 6 | 8 | 8 | 8 | 8 | 8 | 8 | 8 | 8 | 8 | 8 | 8 | 6 |
| # 0.5K yarns | 3 | 3 | 3 | 3 | 3 | 3 | 3 | 2 | 1 | 0 | 0 | 0 | 0 | 0 | 0 | 0 | 2 | 1 | 3 |
| # 2 × 0.5K yarns | 0 | 0 | 0 | 0 | 0 | 0 | 0 | 1 | 2 | 3 | 3 | 3 | 3 | 3 | 3 | 3 | 1 | 2 | 0 |
| Thickness | 1 | 1 | 1 | 1 | 1 | 1 | 1 | 1.2 | 1.5 | 2 | 2.2 | 2.4 | 2.5 | 2.4 | 2.4 | 2.2 | 2.1 | 1.8 | 1.5 | 1.2 |

Naturally, depending on the available yarn weights, different combinations of numbers of layers of yarns and variations in thread count and in weight could be adopted for the profile that is to be obtained.

Figure 9A:
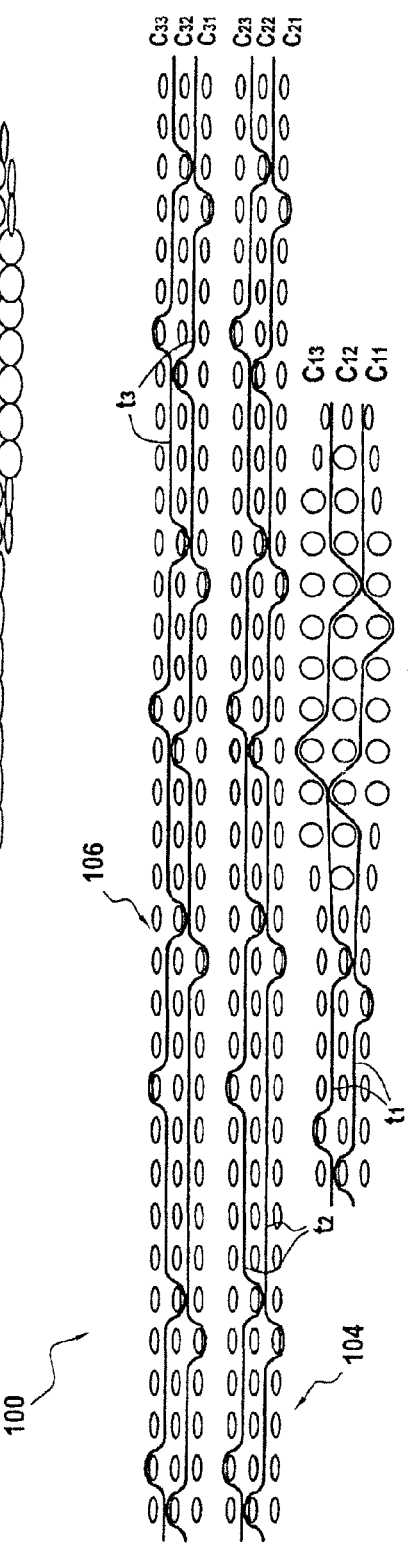
FIGS. 9A and 9B are warp section views showing one way of weaving the FIG. 2 fiber blank.
Figure 9B:
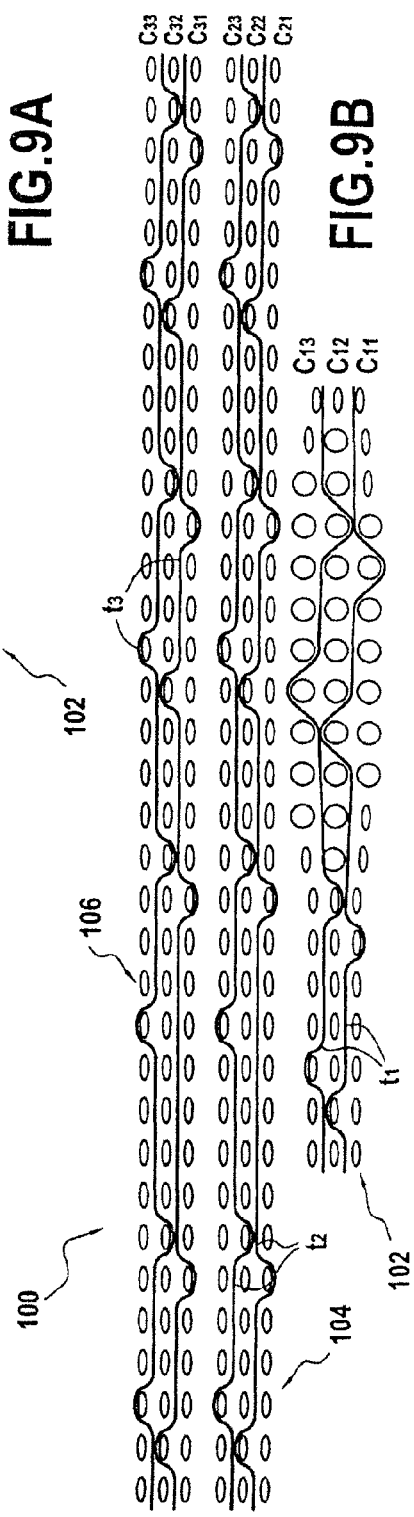

FIGS. 9A and 9B in warp section show two successive planes of a weave that can be used for weaving the fiber blank 100 of FIG. 2 outside the extra thickness 103.

The strip 102 of the fiber blank 100 comprises a set of warp yarn layers, with the number of layers in this example being equal to three (layers $C_{11}$, $C_{12}$, $C_{13}$). The warp yarns are linked together by weft yarns $t_1$ using three-dimensional weaving.

The strip 104 also has a set of warp yarn layers, e.g. likewise three layers (layers $C_{21}$, $C_{22}$, $C_{23}$) that are linked together by weft yarns $t_2$ by three-dimensional weaving, like the strip 102. The same applies for the strip 106 that comprises a set of warp yarn layers e.g. likewise three layers (layers $C_{31}$, $C_{32}$, $C_{33}$) that are linked together by weft yarns $t_3$ by three-dimensional weaving, like the strips 102 and 104.

It should be observed that the weft yarns $t_1$ do not extend into the warp yarn layers of the strips 104 and 106 and that the weft yarns $t_2$ do not extend into the warp yarn layers of the strips 102 and 106, and that the weft yarns $t_3$ do not extend into the warp yarn layers of the strips 102 and 104 so as to ensure that they are not linked together.

In the example shown, the weaving is multilayer weaving using a satin or multi-satin type weave. Other types of three-dimensional weaving could be used, for example multilayer weaving with a multiple plain weave or weaving with an interlock weave. The term "interlock weave" is used herein to mean a weave in which each layer of weft yarns links together a plurality of layers of warp yarns, with all of the yarns in a given weft column having the same path in the plane of the weave.

Various ways of performing three-dimensional weaving are described in particular in document WO 2006/136755, the content of which is incorporated herein by reference. Furthermore, it should be observed that the example described below applies in the same manner to the fiber blank example 100' described with reference to FIGS. 6A and 6B.

Figure 10:
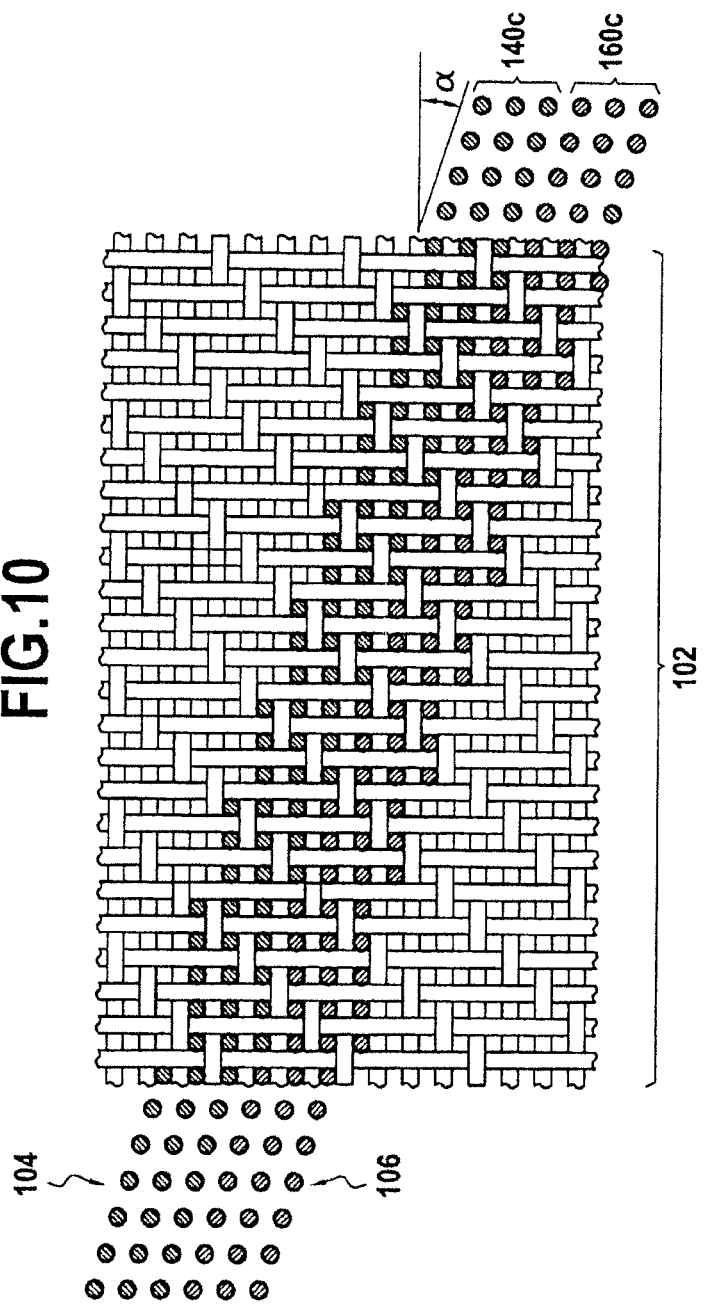
FIG. 10 is a fragmentary section view on a plane parallel to the warp and weft directions in a portion of the FIG. 2 fiber blank corresponding to the location of the junction between the airfoil and the inner platform of the blade.

FIG. 10 is a section view parallel to the warp and weft directions when the connection portions 140c, 160c of the strips 104 and 106 of the FIG. 2 fiber blank cross through the strip 102, these connection portions extending parallel to each other but without being spaced apart (the clearance j1 is zero). In FIG. 10, the warp yarns of these connection portions are shown in section. Each layer of warp yarns extends, in these connection portions 140c, 160c, in a direction that is at an angle $\alpha$ relative to the weft direction of the strip 102. During weaving, the strips 104 and 106 are caused to pass from one side of the strip 102 to the other by passing each warp yarn of the strips 104 and 106 individually through the set of warp and weft yarns of the strip 102 during the weaving process. Naturally, as mentioned above, these connection portions 140c, 160c could be spaced apart from each other, and/or could extend perpendicularly to the warp direction of the strip 102.

Figure 11:
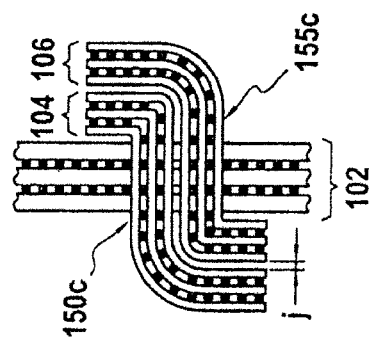
FIG. 11 is a fragmentary weft section view in a portion of the FIG. 2 fiber blank corresponding to the location of the junction between the airfoil and the outer platform of the blade.

FIG. 11 is a weft section view through the place where the connections portions 150c, 155c of the strips 104 and 106 cross through the strip 102. In the example shown, and as mentioned above, the connection portions 150c, 155c extend perpendicularly to the warp direction of the strip 102, and they are substantially parallel to one another while being spaced apart by clearance j2. Nevertheless, as for the connection portions 140c, 160c, it is also possible for the connection portions 150c, 155c to extend while making a non-zero angle relative to the normal to the warp direction, depending on the orientation desired for the outer platform, and/or they need not be spaced apart from each other (j2 may be zero).

For the fiber blank of FIGS. 6A and 6B, the strips 104' and 106' are caused to pass from one side of the strip 102' to the other by causing each warp yarn of the strip 104' to pass individually in one direction through the strip 102', and by causing each warp yarn of the strip 106' individually to pass through the strip 102' in the opposite direction.

The extra thickness 103 may be obtained by using weft yarns of greater weight and by using additional layers of weft yarns, as shown by way of example in FIG. 12A.

In FIG. 12A, the number of layers of weft yarns passes in this example from four to seven between a portion $102_1$ of the strip 102 that corresponds to the tang of the blade and a portion $102_3$ of the strip 102 that presents the extra thickness 103.

In addition, weft yarns $t_1$, $t'_1$, and $t''_1$ of different weights are used, the yarns $t_1$ being, for example, "Nicalon" SiC yarns having a weight of 0.5 K (500 filaments), the yarns $t'_1$ being obtained by uniting two 0.5 K yarns, and the yarns $t''_1$ by uniting three 0.5 K yarns.

Weaving in the blank portion $102_3$ requires a greater number of layers of warp yarns than in the portion $102_1$. Advantageously, this is achieved in the transition between the portion $102_1$ and the portion $102_3$ by reducing the number of warp planes by constituting each warp plane in the portion $102_3$ by uniting warp yarns from two warp planes of the portion $102_1$. FIGS. 12B and 12C show two adjacent warp planes in the portion $102_1$, and FIG. 12D shows a warp plane obtained in the portion $102_3$ by uniting the warp planes of FIGS. 12B and 12C. In FIGS. 12B, 12C, and 12D, the different weights of the warp yarns are not shown (in the manner of FIG. 8) nor are the weights of the weft yarns (in the manner of FIG. 12A) in order to simplify the figure. Between FIGS. 12B & 12C and FIG. 12D, dashed lines show how the warp yarns of the various layers of FIGS. 12B and 12C form the warp yarn layers of FIG. 12D.

Naturally, other combinations of numbers of weft layers and weft yarn weights could be adopted to form the extra thickness 103.

In another embodiment shown diagrammatically in FIG. 13, the extra thickness 103 can be obtained by introducing an insert while weaving the strip 102.

In FIG. 13, the set $T_1$ of weft yarn layers in the portion $102_1$ of the strip 102 that corresponds to the tang of the blade is split by unlinking during weaving to form two subsets $T_{11}$ and $T_{12}$, and an insert $103_1$ is inserted between them. In the example shown, the portion $102_1$ is thicker than the portion $102_2$ of the strip 102 that corresponds to the blade airfoil. The transition between the portion $102_2$ and the portion $102_1$ may be achieved in the same manner as described above for the transition between the portions $102_1$ and $102_3$ in FIG. 12A. The sheets 104 and 106 pass through the sheet 102 via the connection portions 140c and 160c of FIG. 2, possibly by going through the thicker portion $102_1$ (the same applies for the fiber blank of FIGS. 6A and 6B).

At the end of the insert 103 remote from the portion $102_1$, the subsets $T_{11}$ and $T_{12}$ of weft yarn layers are reunited by weaving to form a portion $102'_1$ having the same thickness as the portion $102_1$, and then by a reduction in thickness, a portion $102'_2$ having the same thickness as the portion $102_2$, the portion $102'_2$ forming the portion that corresponds to a blade airfoil for the following woven blank.

The insert $103_1$ is preferably a single piece of ceramic, preferably made using the same ceramic material as is used for the matrix of the composite material of the blade that is to be fabricated. Thus, the insert $103_1$ may be an SiC block obtained by sintering SiC powder.

Figure 14:
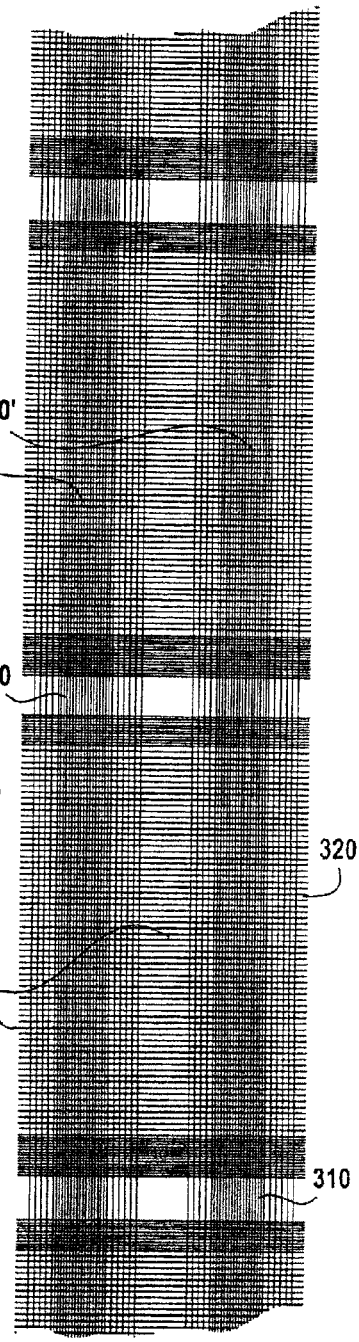

As shown very diagrammatically in FIG. 14, a plurality of fiber blanks 100, 100' may be obtained by weaving a strip 300 having one or more rows of successive fiber blanks formed therein. Extra length zones 310, 320 are formed in the warp direction (having warp yarns only) and in the weft direction (having weft yarns only) to avoid edge phenomena associated with weaving, leaving greater freedom in deformation when the preform is shaped, and providing transition zones between the blanks 100, 100'.

Figure 15:
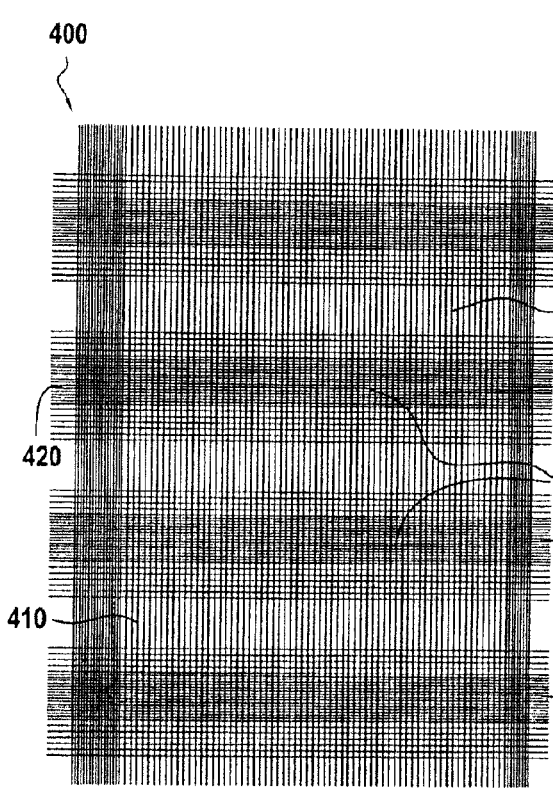
FIGS. 14 and 15 are highly diagrammatic views of two embodiments of a woven fiber strip obtained by three-dimensional weaving and comprising a plurality of fiber blanks such as that of FIG. 2.

FIG. 15 shows a variant embodiment in which a strip 400 is made with a row of blanks 100, 100' woven in the weft direction perpendicularly to the longitudinal direction of the strip. Extra length zones 410, 420 are likewise formed in the warp direction and in the weft direction. A plurality of rows of blanks 100, 100' may be woven, with the width of the strip 400 being adapted for this purpose.

Figure 16:
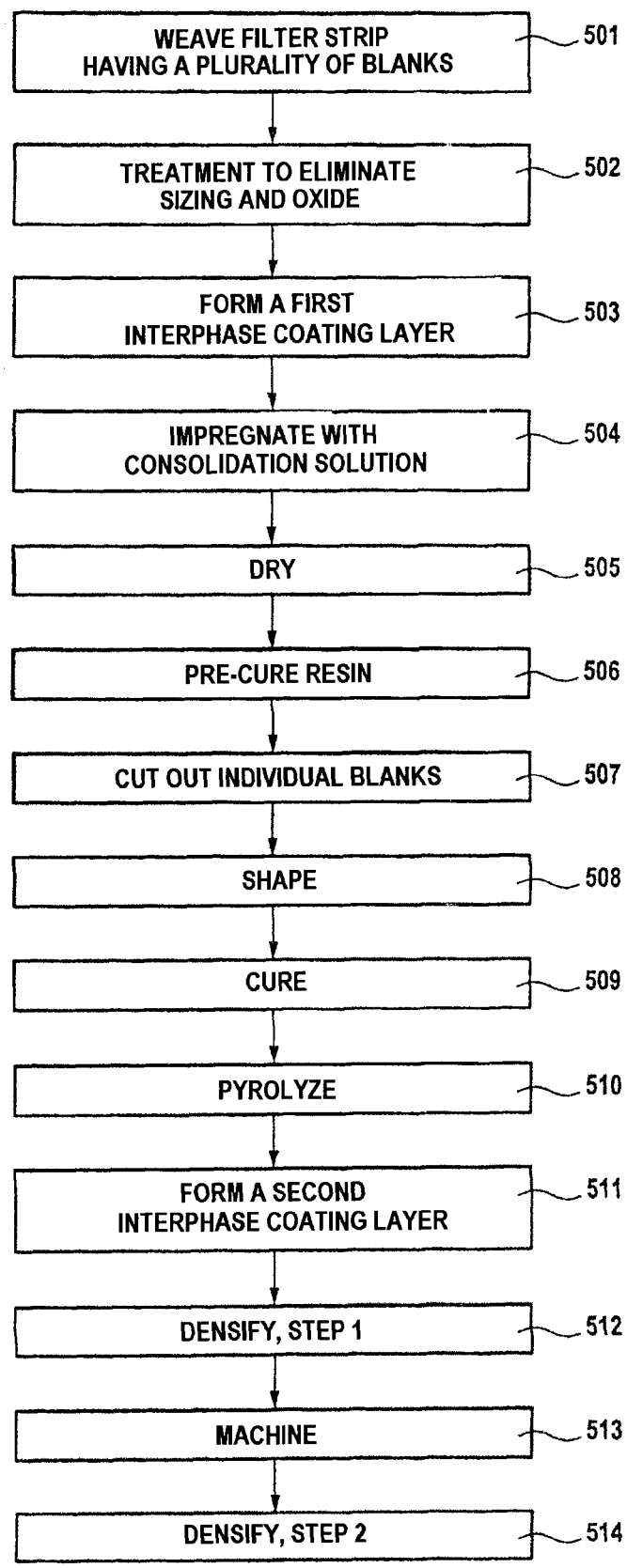
FIG. 16 shows successive steps of a method of fabricating a turbine engine blade in accordance with the invention.

Successive steps in a method of fabricating a blade of composite material in an implementation of the invention are given in FIG. 16.

In step 501, a fiber strip is woven by three-dimensional weaving, the strip comprising a plurality of fiber blanks, e.g. a plurality of rows of fiber blanks extending in the warp direction, as shown in FIG. 14. For turbine engine blades that are to be used at high temperature, and in particular in a corrosive environment (in particular a wet environment), the weaving is performed using yarns made of ceramic fibers, in particular silicon carbide (SiC) fibers.

In step 502, the fiber strip is treated to eliminate the sizing present on the fibers and to eliminate the presence of oxide from the surfaces of the fibers. Oxide elimination is achieved by acid treatment, in particular by immersion in a bath of hydrochloric acid. If the sizing is not suitable for being eliminated by the acid treatment, a prior treatment for eliminating the sizing is performed, e.g. by decomposing it by brief heat treatment.

In step 503, a thin layer of interphase coating is formed on the fibers of the fiber strip by chemical vapor infiltration (CVI). The interphase coating material is constituted for example by pyrolytic carbon (PyC), by boron nitride (BN), or by boron-doped carbon (BC, e.g. having 5 atomic percent (at. %) to 20 at. % of B, the balance being C). The thin layer of interphase coating is preferably of small thickness, e.g. no more than 100 nanometers (nm), or better no more than 50 nm, so as to ensure the fiber blank conserves good capacity for deformation. The thickness is preferably no more than 10 nm.

In step 504, the fiber strip with the fibers coated in a thin layer of interphase coating is impregnated with a consolidation composition, typically a resin that might optionally be dissolved in a solvent. A carbon precursor resin may be used, e.g. a phenolic resin or a furanic resin, or a ceramic precursor resin could be used, e.g. a polysilazane resin or a polysiloxane resin constituting a precursor for SiC.

After drying and eliminating the solvent, if any, from the resin (step 505), the resin may be pre-cured (step 506). Pre-curing, i.e. incomplete cross-linking, serves to increase stiffness and thus strength, while preserving capacity for deformation as is required for making blade preforms.

In step 507, the individual fiber blanks are cut out, as shown in FIG. 3.

In step 508, a fiber blank as cut out in this way is shaped (as shown in FIGS. 4 and 5) and placed in a mold, e.g. a graphite mold, for shaping the airfoil and root preform portion and for shaping the platform preform portions.

Thereafter, the curing of the resin is completed (step 509) and the cured resin is pyrolyzed (step 510). Curing and pyrolyzing can follow one another by progressively raising the temperature in the mold.

After pyrolysis, a fiber preform is obtained that has been consolidated by the residue of the pyrolysis. The quantity of consolidation resin is selected so that the pyrolysis residue bonds the fibers of the preform together sufficiently to enable the preform to be handled while conserving its shape and without assistance from tooling, it being observed that the quantity of consolidation resin is preferably selected to be as small as possible.

Steps for eliminating sizing, for acid treatment, and for forming an interphase coating for an SiC fiber substrate are known. Reference can be made to document U.S. Pat. No. 5,071,679.

A second interphase layer is formed by CVI (step 511) so as to obtain overall a fiber-matrix interphase presenting thickness that is sufficient for it to perform its function of making the composite material non-brittle. The second interphase layer may be of a material selected from PyC, BN, and BC, and need not necessarily be the same material as that of the first interphase layer. The thickness of the second interphase layer is preferably not less than 100 nm.

It is preferable to make an interphase out of two layers, as described above. This is described in the French patent application filed under the No. 08/54937 by Snecma Propulsion Solide.

Thereafter the consolidated preform is densified with a matrix. For a turbine engine blade that is to be used at high temperature, and in particular in a corrosive medium, the matrix is a ceramic matrix, e.g. made of SiC. It is possible to perform densification by CVI, in which case forming the second interphase layer and densifying with the matrix may follow one another in the same oven.

Densification may be performed in two successive steps (steps 512 and 514) that are separated by a step 513 of machining the blade to the desired dimensions.

It should be observed that pre-machining may be performed between steps 509 and 510, i.e. after curing and before pyrolyzing the resin.

Figure 17:
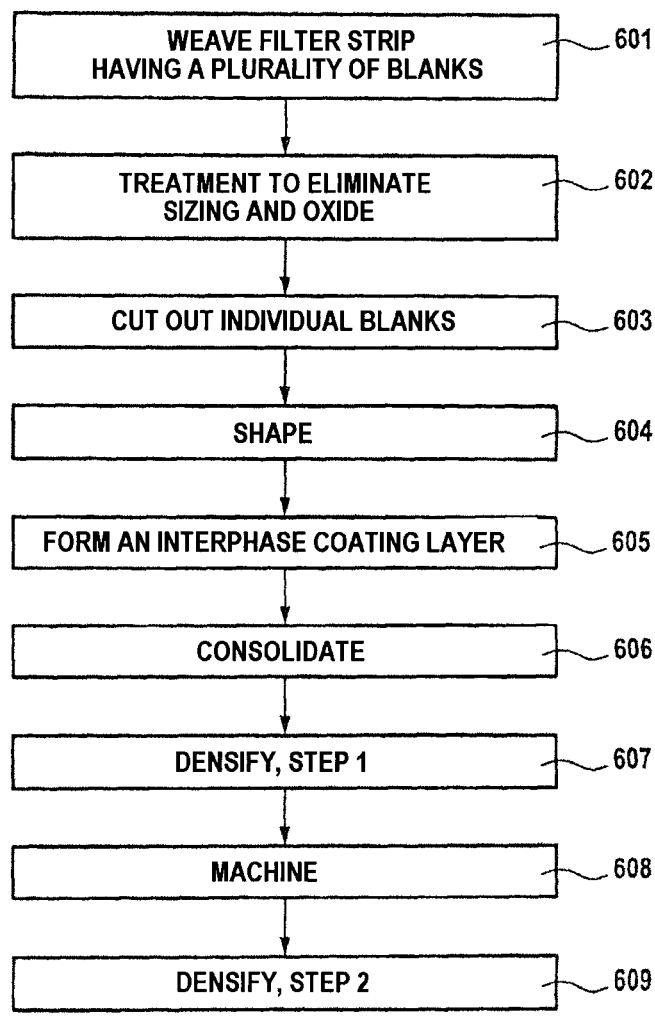
FIG. 17 shows successive steps of a method of fabricating a turbine engine blade in accordance with the invention.

Successive steps of a method of fabricating a blade of composite material in another implementation of the invention are given in FIG. 17.

The step 601 of three-dimensionally weaving a fiber strip comprising a plurality of fiber blanks, and the step 602 of treatment to eliminate sizing and oxide are similar to steps 501 and 502 of the implementation of FIG. 16.

In step 603, individual fiber blanks are cut out from the fiber strip, and then each individual fiber blank is shaped in a mold or jig (step 604) to obtain a blade fiber preform by shaping the airfoil and root preform portion and by shaping the platform preform portions.

In step 605, an interphase coating for making the material non-brittle is formed by CVI on the fibers of the preform while held in the jig. By way of example the interphase coating material is PyC, BN, or BC, as mentioned above. The thickness of the interphase coating is about one hundred to a few hundreds of nanometers.

With the preform still held in the jig, it is consolidated by partial densification (step 606), the consolidation being performed by forming a deposit of ceramic on the fibers by CVI.

The formation of the interphase coating by CVI and the consolidation by ceramic deposition by CVI can follow on one from the other in the same CVI oven.

The jig is preferably made of graphite and presents holes for facilitating the passage of reaction gases that provide the interphase deposit and the ceramic deposit by CVI.

Once consolidation is sufficient for the preform to be handled while conserving its shape and without assistance from support tooling, the consolidated preform is extracted from the jig and it is densified with a ceramic matrix by CVI. Densification may be performed in two successive steps (steps 607 and 609) separated by a step 608 of machining the blade to the desired dimensions.

In the description above, an airfoil profile of varying thickness is obtained by using yarns of varying weight and/or count. In a variant, it is possible to make the portion of the fiber blank that corresponds to the airfoil portion of the preform with a certain number of layers of same-weight yarns and with an unvarying count, the thickness of the profile being varied during machining after the first densification step or during pre-machining of the consolidated blank preform.

Furthermore, depending on the intended conditions of use for the blade, the fibers of the fiber reinforcement of the blade may be made of a material other than a ceramic, e.g. they may be made of carbon, and the matrix may be made of a material other than a ceramic, e.g. of carbon or of resin, the invention naturally also being applicable to fabricating blades out of a composite material having an organic matrix.

The invention claimed is:

1. A method of fabricating a turbine engine blade out of composite material comprising fiber reinforcement densified by a matrix, the method comprising:
    performing three-dimensional weaving to make a single-piece fiber blank;
    shaping the fiber blank to obtain a single-piece fiber preform having a first portion forming a preform for a blade root and an airfoil, at a second portion forming a preform for a blade inner platform or for wipers of a blade outer platform, and a third portion forming a preform for reinforcing a blade inner platform or for an overhang of a blade outer platform; and
    densifying the fiber preform with a matrix to obtain a composite material blade having fiber reinforcement constituted by the preform and densified by the matrix, and forming a single piece with at least one of an inner platform and an outer platform incorporated therein,
    wherein, in a longitudinal direction corresponding to a longitudinal direction of the fiber blank that is to be fabricated, the fiber blank comprises:
        a first set of a plurality of yarn layers that are linked together to form the first portion of the blank corresponding to the blade root and airfoil preform;
        a second set of a plurality of yarn layers that are linked together at least locally to form at least the second portion of the blank corresponding to the blade inner platform preform or to the blade outer wiper preform; and
        a third set of a plurality of yarn layers that are linked together at least locally to form the third portion of the blank corresponding to the blade inner platform reinforcement preform or to the blade outer platform overhang preform;
    wherein the yarns of the first set of yarn layers are not linked with the yarns of the second and third sets of yarn layers; and
    wherein the first set of yarn layers has yarns of the second and third sets of yarn layers crossing through the second portion of the fiber blank and through the third portion of the fiber blank.

2. A method according to claim 1, wherein the fiber blank is woven with second and third continuous sets of yarn layers and shaping of the fiber blank includes eliminating portions of the second and third sets of yarn layers that lie outside the second fiber blank portion and the third fiber blank portion by cutting said portions of the second and third sets of yarn layers off.

3. A method according to claim 1, wherein the second and third sets of yarn layers cross through the first set of yarn layers in a same direction.

4. A method according to claim 1, wherein the second and third sets of yarn layers cross through the first set of yarn layers in opposite directions.

5. A method according to claim 1, wherein, in the first portion of the fiber blank and in a direction that corresponds to a direction along which a profile of a varying-thickness airfoil extends in the blade that is to be fabricated, the number of yarn layers in the first set of yarn layers is constant.

6. A method according to claim 5, wherein the yarns of the first set of yarn layers are of varying weight.

7. A method according to claim 5, wherein thread count of the yarns of the first set of yarn layers varies.

8. A method according to claim 1, wherein three-dimensional weaving is used to make a strip comprising a succession of fiber blanks.

9. A method according to claim 1, wherein the blanks are woven with the longitudinal direction that corresponds to a direction of the blades that are to be fabricated extending in a weft direction.

10. A method according to claim 1, wherein the blanks are woven with the longitudinal direction that corresponds to a direction of the blades that are to be fabricated extending in a warp direction.

11. A turbine engine fitted with at least one blade fabricated using the method of claim 1.

12. A turbine engine blade made of composite material comprising fiber reinforcement obtained by three-dimensional weaving of yarns and densified by a matrix, the blade comprising:
    a first portion constituting a root and airfoil of the blade and that is formed integrally with:
    a second portion constituting a blade inner platform or wipers of a blade outer platform; and
    a third portion constituting inner platform reinforcement or a preform for overhangs of a blade outer platform;
    the fiber reinforcement portions corresponding to the first, second, and third blade portions being mutually interleaved at least in part with yarns of the first portion of the fiber reinforcement penetrating into the second portion of the fiber reinforcement,
    wherein the yarns constituting the portion of the fiber reinforcement that corresponds to the first portion of the blade are not linked with the yarns constituting the portion of the fiber reinforcement that corresponds to the second and third portions of the blade, and
    wherein the yarns constituting the portion of the fiber reinforcement that corresponds to the second and third portions of the blade cross through the portion of the fiber reinforcement that corresponds to the first portion of the blade.

13. A blade according to claim 12, made of ceramic matrix composite material.

14. A blade according to claim 12, wherein the blade airfoil has a profile of varying thickness along which the fiber reinforcement portion corresponding to the first blade portion includes, in a longitudinal direction of the blade, a constant number of layers of yarns that are of varying of at least one of weight and thread count.

15. A blade according to claim 12, wherein the blade airfoil has a profile of varying thickness along which the fiber reinforcement portion corresponding to the first portion of the blade has a varying number of yarn layers extending in a longitudinal direction of the blade.

16. A turbine engine fitted with at least one blade according to claim 12.

* * * * *